United States Patent [19]
Eck et al.

[11] 3,733,582
[45] May 15, 1973

[54] DIGITAL DEPTH SOUNDER

[75] Inventors: Calvert F. Eck, Osterville; Howard H. Hill, Pocasset, both of Mass.

[73] Assignee: Datamarine International, Inc., Pocasset, Mass.

[22] Filed: Feb. 25, 1971

[21] Appl. No.: 118,731

[52] U.S. Cl. ................................. 340/3 R, 340/3 E
[51] Int. Cl. ............................................. G01s 9/68
[58] Field of Search ...................... 340/1 C, 1 R, 3 E, 340/3 R; 343/7.5

[56] References Cited

UNITED STATES PATENTS

| | | |
|---|---|---|
| 2,890,437 | 6/1959 | Dudley et al. .......................... 340/3 R |
| 3,038,142 | 6/1962 | Wippert ................................. 340/1 R |
| 3,528,053 | 9/1970 | Rubin .................................... 340/3 R |
| 3,307,143 | 2/1967 | Wyse et al. ............................ 340/3 R |

Primary Examiner—Richard A. Farley
Attorney—David A. Rich et al.

[57] ABSTRACT

A digital depth sounder in which a pulse of radiant energy is directed towards a reflecting object, and reflection is detected by a receiver, wherein the time between the transmitted and received pulses are measured as an indication of the distance to the reflector, and in which both the gain of the receiver and the power output of the transmitter are regulated in accordance with the strength of the received reflection.

16 Claims, 12 Drawing Figures

Patented May 15, 1973

INVENTORS
CALVERT F. ECK
HOWARD H. HILL
BY *Rich & Ericson*
ATTORNEYS

INVENTORS
CALVERT F. ECK
HOWARD H. HILL
BY Rich & Ericson
ATTORNEYS

INVENTORS
CALVERT F. ECK
HOWARD H. HILL

BY *Rich & Ericson*
ATTORNEYS

Patented May 15, 1973 3,733,582

INVENTORS
CALVERT F. ECK
HOWARD H. HILL

BY *Rich & Ericson*
ATTORNEYS

INVENTORS
CALVERT F. ECK
HOWARD H. HILL

BY Rich & Ericson
ATTORNEYS

INVENTORS
CALVERT F. ECK
HOWARD H. HILL
BY *Rich & Ericson*
ATTORNEYS

DIGITAL DEPTH SOUNDER

Our invention relates to depth sounders, and particularly to a novel digital depth sounder having improved reliability, dynamic range and selectivity.

Sonic range finders have long been known in which a sonic pulse is transmitted, and the time between the transmission and the reception of anecho is used as an indication of the distance from a reflecting object. The objects of our invention are to improve the reliability, selectivity and dynamic range of such distance determining systems.

The above and other objects of our invention are attained by a novel depth sounder in which there is a transceiver, which at times functions as a transmitter to excite a transducer to produce a sonic pulse, and at other times serves as a receiver to detect the echo returned from a reflecting object by the transmitted pulse. During the transmission of the pulse, the receiver function is disabled, and following the receipt of the first echo pulse, the distance from the reflecting object is displayed. Provision is made for eliminating a number of problems that have been encountered in prior apparatus of this kind, and in particular the response to false echoes, multiple echoes, false bottom indications, and noise.

A basic feature of the invention is a combined transmitter and receiver, more properly termed a transceiver because the structure and functions of the transmitter and receiver are highly interdependent. The transceiver incorporates an oscillator triggered by a transmit pulse to produce a burst of energy applied to the transducer to constitute a master pulse propogated towards those reflectors which may be in its path; e.g., particularly the bottom of the water below a boat on which the apparatus is installed. The power of this pulse is determined by a control voltage that is determined by the average power of the returned signal to the receiver. This control voltage forms part of a gain control circuit for the receiver so constructed that at higher received signal levels, the power output of the transmitter is reduced, whereas at lower average signal levels received, the transmitter power is increased. At the same time, the receiver gain is affected by the same signal sense so that a very large dynamic range of response is made available. Among other problems solved by this mode of operation are those caused when a very strong pulse, necessary to produce a sufficient echo return in deep water, is transmitted in shallow water, with the result that many echoes are returned by reverberation between the transducer and the bottom. In the apparatus of our invention, those multiple echoes are both reduced by adjustment of the transceiver and eliminated by logic circuits controlling the transmit-receive functions.

Another feature of the invention is the provision of means for displaying only the first returned echo, in order to ignore any multiple echoes that may be produced. In accordance with one mode of operation, when it is desired to detect the presence of fish at intermediate depths, an audible alarm is sounded when fish are detected, and the depth of the fish is displayed. A depth alarm is also preferably provided which can be set to provide an audible alarm at any time when the depth of water goes below a value that is preselected by the operator.

In accordance with still another feature of the invention in its preferred embodiment, means are provided for inhibiting a second echo from a reflector from within a short distance of, and farther from, a first reflector, primarily in order to prevent the indication of a hard bottom below a shallow layer of mud. In other words, it is preferred to display the depth to the first obstruction below the vessel, whether it is soft or hard in nature.

The manner in which the apparatus of our invention is constructed, and its mode of operation, will be best understood in the light of the following detailed description, together with the accompanying drawings, of a preferred embodiment thereof.

Figure 1:
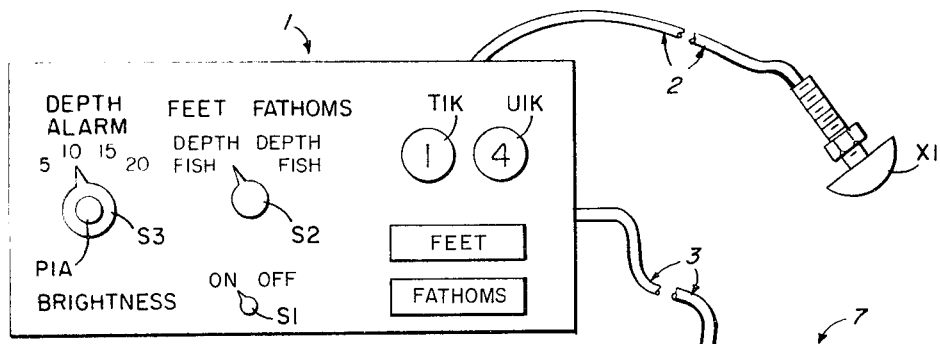
FIG. 1 is a schematic diagram of a main indicator, a remote indicator, a transducer and their interconnecting cables that comprise the apparatus of our invention in accordance with the manner in which it is packaged for installation on a vessel.
Figure 4:
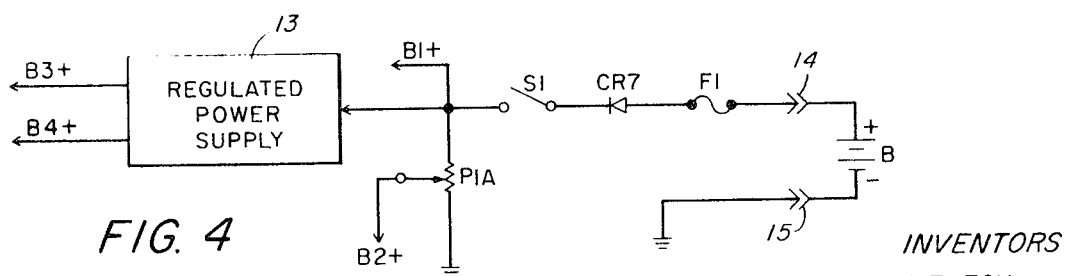
Figure 5:
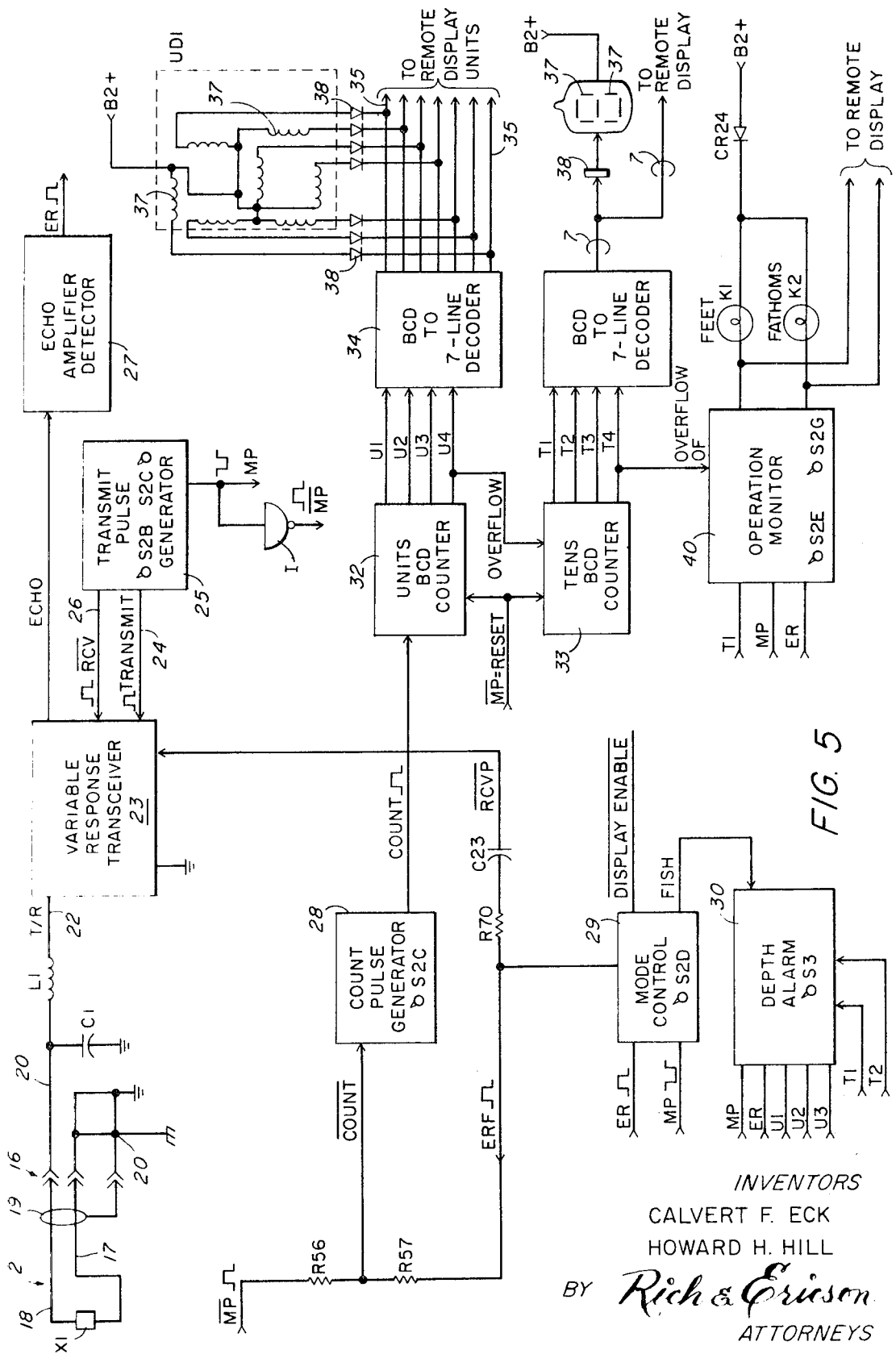
Figure 6:
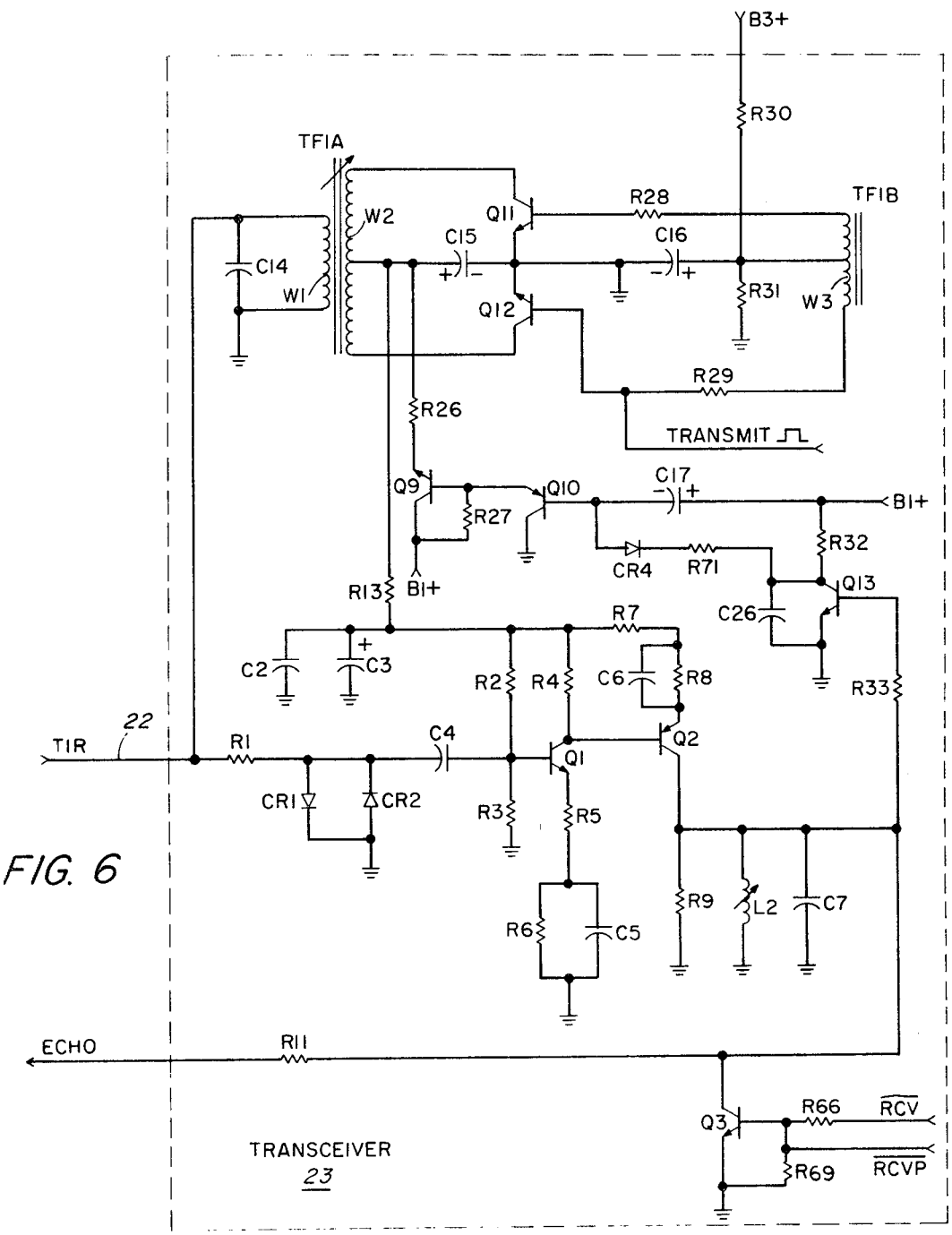
Figure 7:
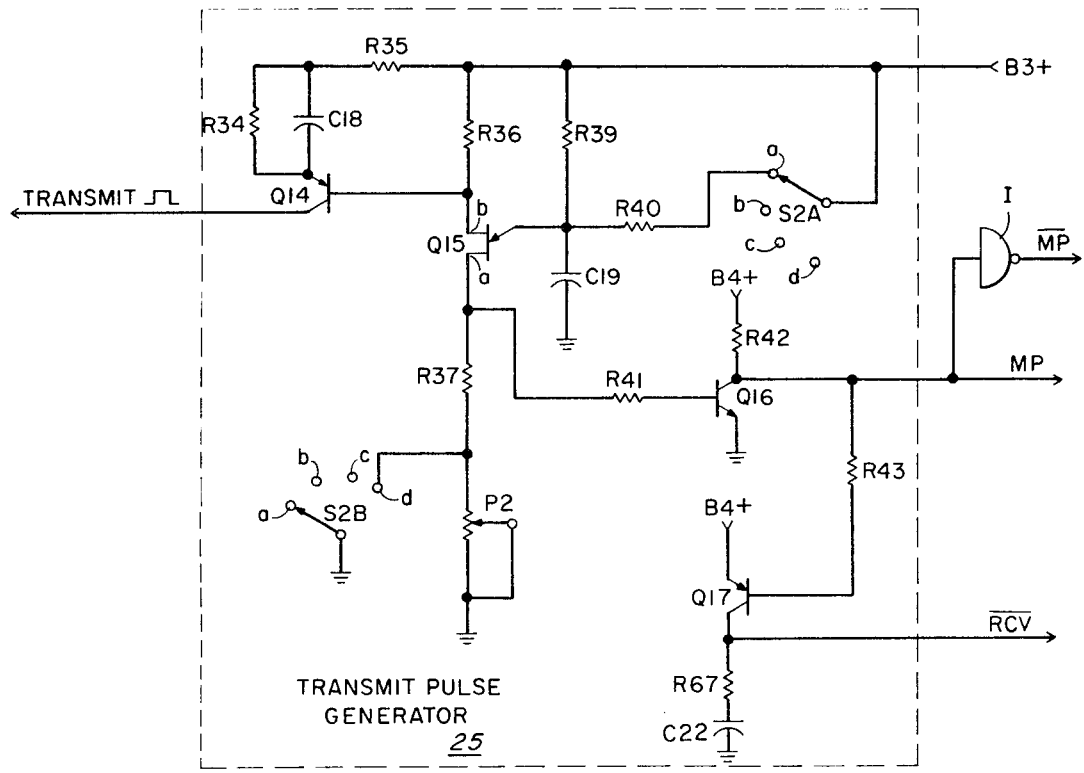
Figure 8:
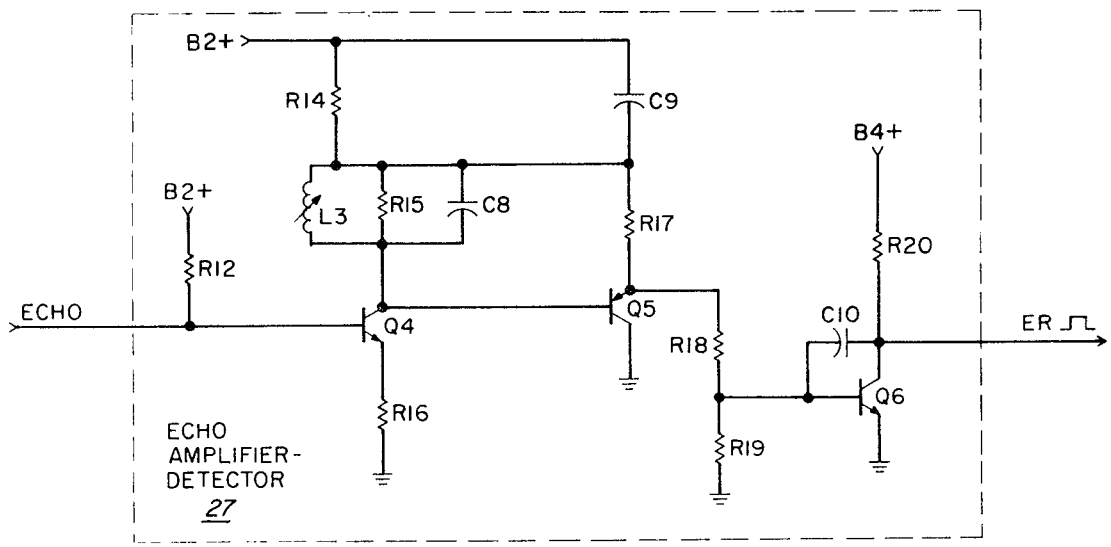
Figure 9:
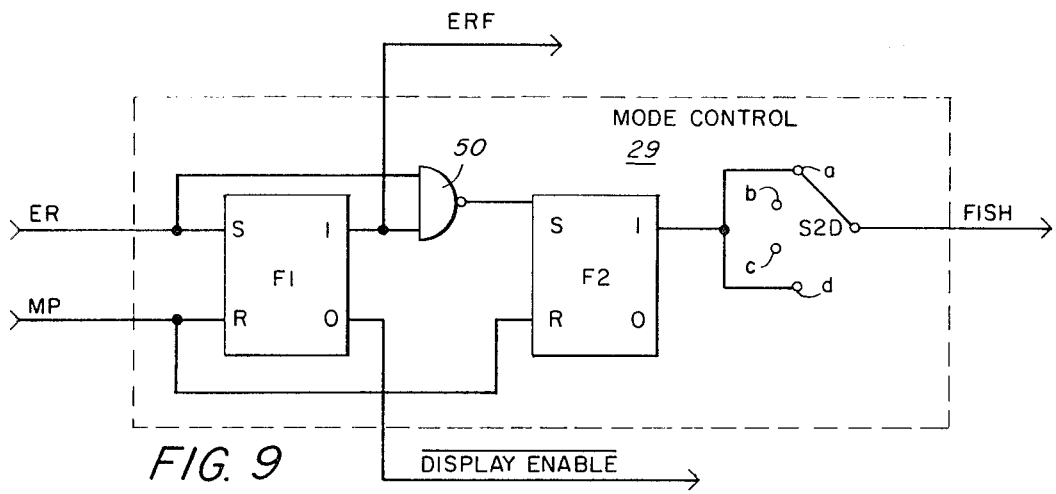
Figure 10:
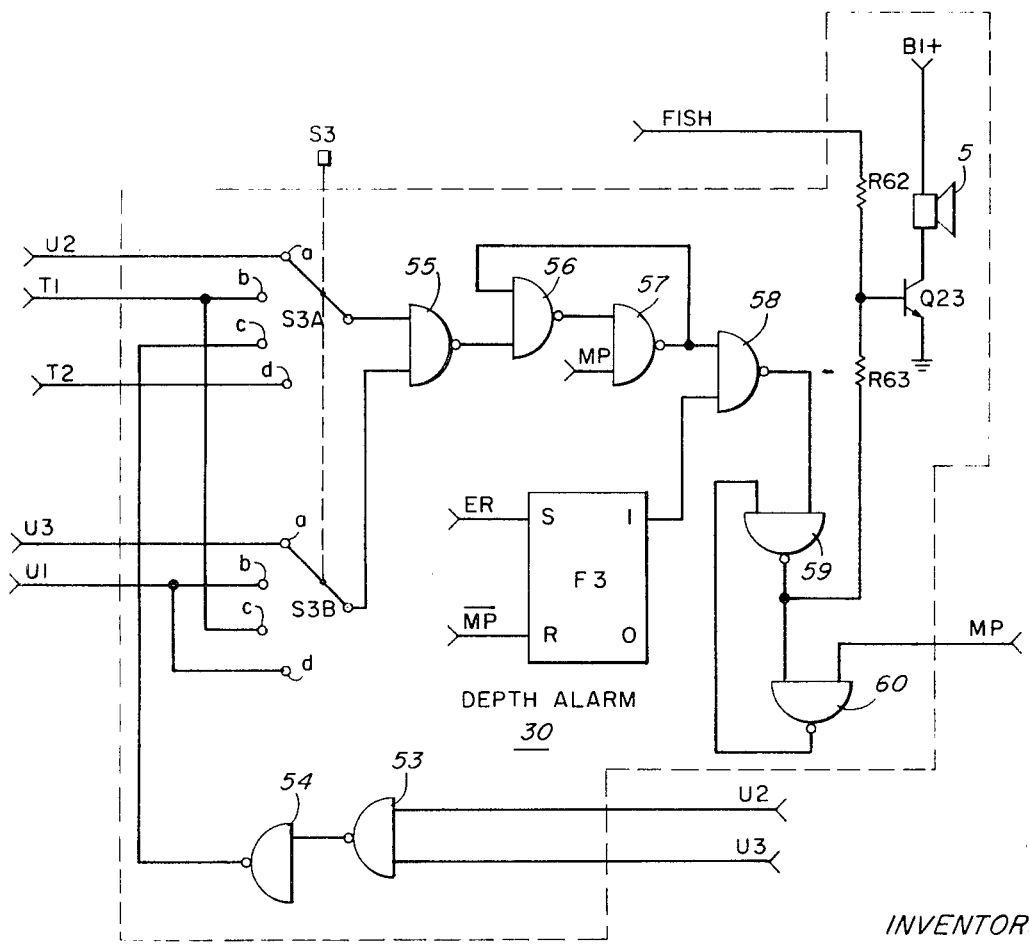
Figure 11:
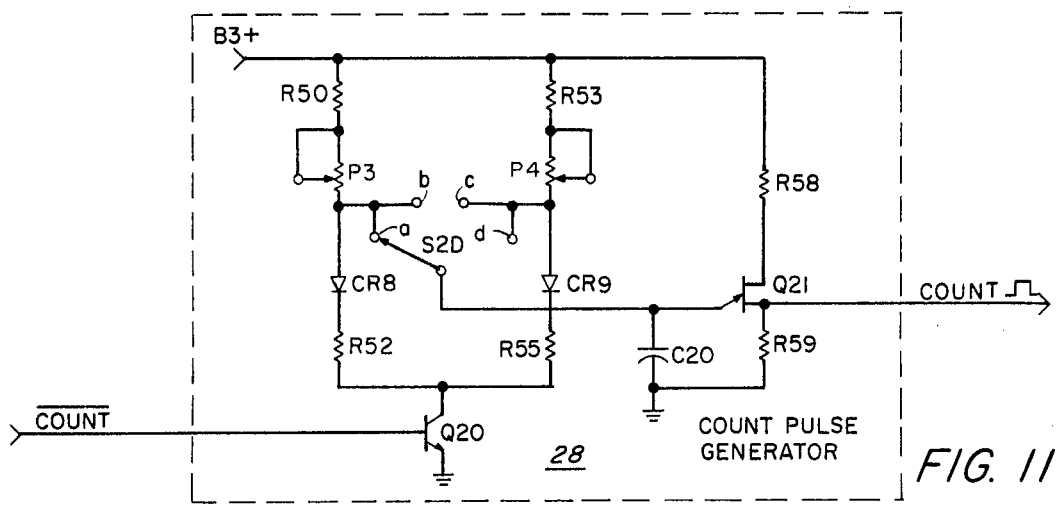
Figure 12:
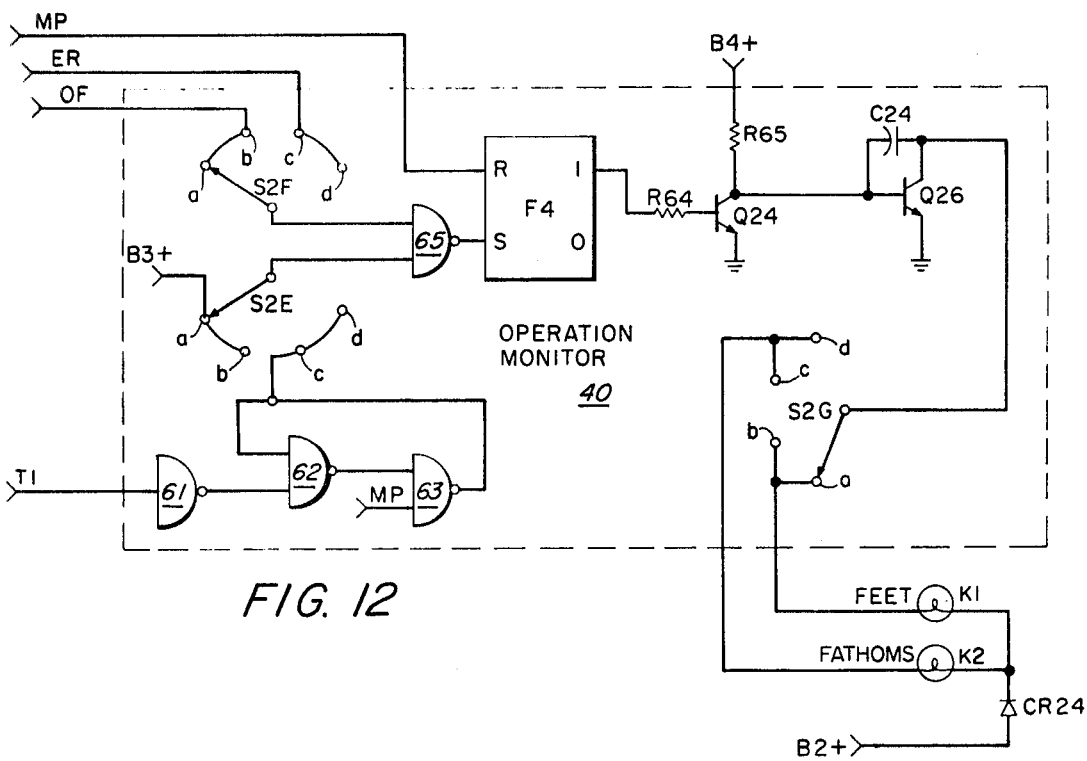

Elsewhere in the drawings, the various decks of the switch are shown independently, in order to simplify the illustration;

FIG. 4 is a schematic wiring diagram of a power supply for the apparatus of our invention;

FIG. 5 is a schematic block and wiring diagram of a depth indicating system in accordance with our invention;

FIG. 6 is a schematic wiring diagram of a transceiver forming a part of the apparatus of FIG. 5;

FIG. 7 is a schematic wiring diagram of a transmit pulse generator forming a part of the apparatus of FIG. 5;

FIG. 8 is a schematic wiring diagram of an echo amplifier and detector forming a part of the apparatus of FIG. 5;

FIG. 9 is a schematic wiring diagram of a mode control forming a part of the apparatus of FIG. 5;

FIG. 10 is a schematic wiring diagram of a depth alarm forming a part of the apparatus of FIG. 5;

FIG. 11 is a schematic diagram of a count pulse generator forming a part of the apparatus of FIG. 5; and FIG. 12 is a schematic diagram of an operation monitor forming a part of the apparatus of FIG. 5.

Before discussing the drawings in detail, it should be noted that the division of the system into the blocks shown in FIGS. 4 and 5 is functional and rather arbitrary; it is done purely for convenience in exposition. In practice, all of the circuits of FIGS. 4 and 5 except the battery, the transducer and its cable are packaged together in the main indicator housing 1.

Figure 3:
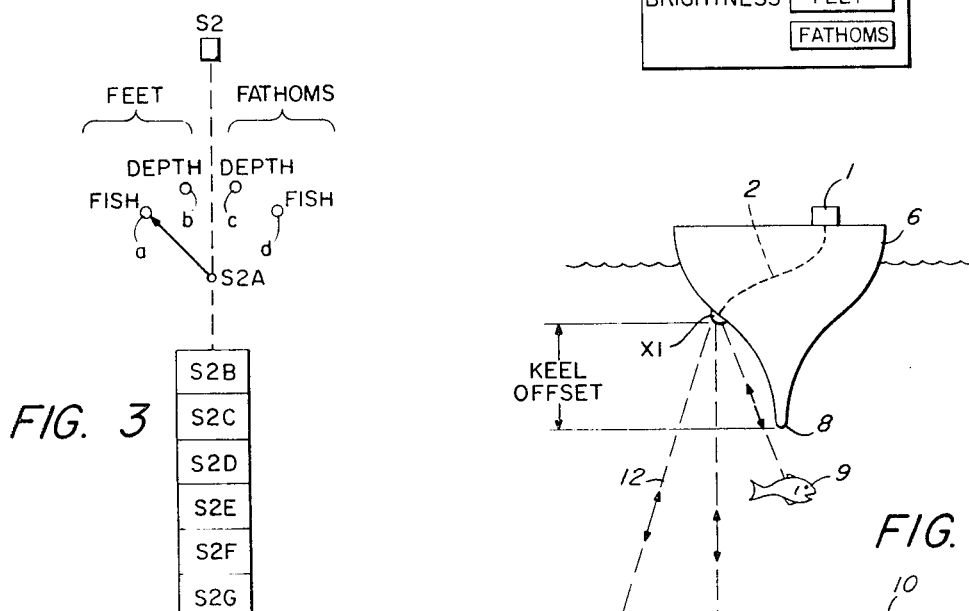
FIG. 3 is a schematic diagram of a ganged seven-deck, four-pole-per-deck switch used to determine the mode of operation of the apparatus. As indicated, each deck such as S2A of the switch has four positions labelled $a$, $b$, $c$, and $d$.

Referring now to FIG. 1, the apparatus comprises a housing 1 that may be mounted on any convenient bracket or the like, or installed in an instrument panel, in any convenient position to be operated and observed by the operator of the vessel. External apparatus on the housing 1 includes an ON and OFF switch S1, which in the ON position supplies electrical power to the apparatus. A mode switch S2 is provided which has four positions, indicated as a, b, c, and d in FIG. 3. The switch S2 determine by its position whether the depth display is in feet or in fathoms, and whether or not the depth of fish is to be audibly indicated as well as displayed. Two indicator tubes U1K and T1K are provided to indicate the units and tens digits of the display, respectively, and will thus display depths from 0 to 99 feet or from 0 to 99 fathoms, depending on the setting of the switch S2. A pair of bezels labelled FEET and FATHOMS are provided, behind which a pair of selectively illuminable lamps are mounted and selected for illumination in a manner to be described in dependence on the mode of operation of the apparatus.

A four-position switch S3 is provided, which may be set to cause an audible depth alarm to be sounded at depths below 5, 10, 15, or 20 feet or fathoms, depending on the setting of the switch S2. Obviously, these alarm settings are merely typical and any set of values can be chosen depending upon the nature of the vessel and the waters in which it is to be operated.

A potentiometer P1A, mounted concentrically with the switch S3 in a manner that will be familiar to those skilled in the art, is provided to adjust the brightness of the display of the indicators U1K and T1K. This control is desirable so that the optimum brightness can be provided for either day or night operation, and in dependence on the ambient light in the area where the indicators are mounted.

The indicator 1 is connected over a cable generally designated 2 to electro-acoustic transducer X1 of any conventional construction adapted to produce an output sonic pulse in response to an applied electrical pulse, or, conversely, to produce an electrical signal in response to an applied acoustic pulse. As indicated, it is fitted with a conventional through-bolt 4 and nut 5 to secure it to a suitable location on the hull of a vessel 6, as schematically indicated in FIG. 2.

One or more remote indicators 7 may be provided, and connected to the master indicator 1 over cables such as 3. Such a remote signal unit 7 is preferably provided with an independent brightness control P1B, together with repeater indicators U2K and T2K that repeat the indication of the units and tens indication of the main display. If desired, the remote indicators may be also provided with monitoring bezels labelled FEET and FATHOMS, behind which operation monitoring lamps are mounted to be operated in a manner to be described.

Figure 2:
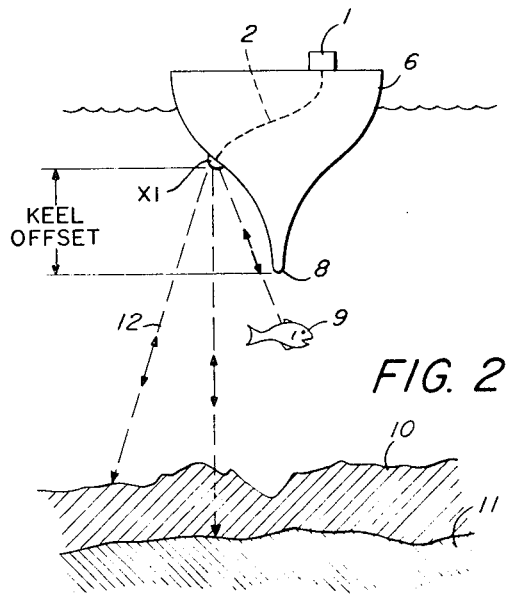
FIG. 2 is a schematic diagram of a boat equipped with the apparatus of our invention and illustrating its response under various conditions.

As indicated in FIG. 2, the vessel 6 may have more or less depth of keel 8 below the transducer X1, depending on where the most convenient location for the transducer may turn out to be, and on the nature of the vessel. The transducer X1 will be exposed to echoes from fish, as indicated at 9.

The principal response from fish are returned from their air bladders, and naturally the strength of such echoes depend not only on the size of the fish, but on their depth and numbers.

The transducer X1 will also communicate with the bottom, which may comprise an upper layer 10, of mud, sea weed, or the like, which may or may not exist over a harder bottom layer 11. The bottom layer will also return a more or less attenuated echo.

The transducer will also be exposed to noise, as indicated at 12, which may come from any source, and for example and particularly from the engine or propeller or the vessel itself. As will appear, the apparatus is preferably so tuned that such noise is primarily ignored.

Referring next to FIG. 4, we have schematically indicated the power supply for the apparatus, which is primarily included for simplicity in the later description of a particular embodiment of the invention. Specifically, a battery B serves as a primary source of energy and is connected over conventional connectors 14 and 15 between ground and a fuse F1. The fuse F1 leads through a rectifier CR7 to the ON/OFF switch S1 described in connection with FIG. 1.

When the switch S1 is closed, a first supply voltage B1+ is provided, which may be, for example, 12 volts. A brightness voltage B2+ is provided which may be varied by the operator to control the brightness of the display in the manner briefly described above. In practice, it is preferred to employ a control amplifier rather than a simple potentiometer P1A as shown, but that is a detail beyond the scope of the present invention with which it is not thought necessary to deal. A regulated power supply 13 of any conventional construction is supplied by the voltage B1+, for the purpose of producing two regulated output voltages B3+ and B4+, which may be, in the particular embodiment to be described, $-7.5$ volts and $-5$ volts, respectively.

Referring next to FIG. 5, the cable 2 connecting the transducer X1 to the other components of the depth sounding system consists of a ground lead 17, an active lead 18, and a cable shield 19. The ground 17 and shield 19 are connected both to earth ground and to chassis ground, as indicated at 20.

A conventional cable connector 16 is provided to facilitate the connection of the cable to the other apparatus. An active input and output lead 20 is connected to the lead 18 over the connector 16 and is connected through a impedance matching inductor L1 to the input/output terminal 22 of a variable response transceiver 23, to be described in more detail below. A capacitor C1 may be employed to shunt the lead 20 for additional matching if needed, but may be omitted if the impedance of the cable 2 makes it unnecessary. The value of the capacitor will, in general, depend in a particular installation on the length of the cable required as determined by the desired locations of the display unit and the transducer.

The transceiver 23 at times supplies an output pulse to the transducer X1. This pulse is produced in response to a TRANSMIT pulse supplied to the transceiver over a lead 24 from a transmit pulse generator 25 to be described in more detail below. The decks S2A and S2B of the control switch S2 are associated with the transmit pulse generator 25, for purposes to appear. Basically, the position of the switch deck S2A sets the pulse rate at which TRANSMIT pulses are produced, and the deck S2B introduces a keel offset function when the depth of the water is being measured in feet.

When a TRANSMIT pulse is produced over the lead 24, a positive pulse labelled RCV is supplied to the transceiver 23 over a lead 26 to disable the receiving function of the transceiver. At the same time, a negative pulse MP is produced that has a duration depending on the switch setting of the switch S2 for purposes to be described. An inverter I produces a positive level MP when the signal MP is present. In response to the transmit pulse, the transceiver produces an output signal on the lead 22 that will apply to the transducer X1 a voltage whose amplitude is determined by the average level of echo pulses received back by the transducer X1 in a manner that will be described below. Basically, for shallow depths the pulse supplied to the transducer X1 may be as little as 30 volts peak-to-peak, whereas for greater depths from 250 volts to 300 volts peak-to-peak may be applied. The transmit pulse is not particularly critical in frequency or duration, but is preferably about 250 microseconds in duration, with a frequency of 120 KHz.

After a pulse has been produced by the transducer X1, when a returning echo pulse is received, it is supplied to the transceiver 23 and amplified to supply an ECHO signal to an echo amplifier and detector 27. In the receive mode the transceiver operates with a gain that is also determined by the average echo response received.

The echo amplifier and detector 27 functions in a manner to be described below to produce an echo pulse ER in response to the first received ECHO pulse. Between the trailing edge of the pulse MP produced by the transmit pulse generator 25 and the echo pulse ER, a count pulse generator 28 is rendered effective to supply COUNT pulses at a rate determined by the setting of the switch deck S2C. For example, this rate may be 2400 pulses per second when the switch S2 is in either of the feed measuring positions, and 400 pulses per second in the fathoms measuring positions.

The pulse MP acts through a resistor R56 to produce a positive COUNT signal to the pulse generator 28 to disable it during the pulse MP. Similarly, the echo received pulse ER acts through a mode control 29 to produce a positive signal ERF that disables the pulse generator 28 through a resistor R57. The level ERF is removed by the application of the pulse MP to the mode control 29, as will appear.

The switch deck S2D functions in the mode control system to determine whether or not it is desired to indicate audibly when fish are encountered. This is accomplished by applying a positive signal labelled FISH to a depth alarm 30, to be described, so that in addition to an audible alarm produced when the switch S3 is set to a depth higher than that encountered by the vessel, an audible alarm will also be produced when fish are detected even though the water is deeper than that for which the depth alarm is set.

When COUNT pulses are produced by the count pulse generator 28 in the interval between the trailing edge of the pulse MP and the pulse ER, those are supplied to a units binary-coded decimal counter 32 that recycles at the ten count and overflows to produce an overflow signal that steps a tens binary-coded decimal counter 33. Counters 32 and 33 are disabled by the signal MP so that they are both reset at the beginning of the counting cycle.

The units counter 32 produces four output signals U1, U2, U3, and U4 in binary decimal code that are applied to a conventional binary-coded decimal to seven-line decoder 34 having seven output leads such as 35 that decode the four-bit input into a seven-bit output signal serving to energize the display tube UD1. The display tubes UD1 and TD1 may be of the conventional variety containing seven filaments such as 37, wired as shown for the unit UD1, and supplied from the brightness control by the voltage B2+. The physical array of the filaments 37 is more clearly shown for the unit TD1. The arrangement is such that an appropriate selection of ground signals applied to the blocking diodes such as 38 connected to the filaments will enable the display of the numbers 0 through 9. As indicated for the unit UD1, each filament is returned through a separate diode such as 38 through a different one of the leads 35, such that when a lead 35 is brought to ground, the corresponding diode will pass current through the filament to which it is connected and cause that filament to be illuminated.

In addition to the units just described, the system is preferably provided with an operation monitor generally designated 40 with which the switch decks S2E, S2F, S2G are associated for purposes to be described. Operation monitor 40 receives an overflow signal OF from the lead T4 when the tens counter 33 overflows, the lowest ordered tens bit signal T1 from the counter 33, and the signals ER and MP. It functions to control two lamps K1 and K2 which are effective in the feet and fathoms modes, respectively, and which receive power from the brightness control voltage B2+ through a diode CR24. Briefly, in the feet positions of the switch S2, the lamp K1 will be lit unless the counter 33 overflows, indicating that no echo was received or that the depth is more than 99 feet and that the switch S2 should be switched to the fathoms mode. When either of those conditions occurs, the lamp K1 will blink.

The lamp K2 is effective in the fathoms mode of operation. In either of the fathoms measuring positions of the switch S2, the lamp K2 will be lit unless the vessel gets into water below ten fathoms in depth, under which conditions it will blink, indicating that an indication in feet would be more appropriate.

Having described the construction and operation of the system as a whole, the details of the various block diagrams of FIG. 5 will be next described. Reference will first be made to FIG. 6, in which the transceiver 23 is shown.

While the functions of the transmitting and receiving portions of the transceiver of FIG. 6 are highly interdependent, for convenience of explanation those portions essentially concerned with transmission will be described first, those functions primarily concerned with reception will next be described, and finally the common elements will be described to illustrate how the apparatus varies its response in accordance with the average level of the first echo pulses received in each cycle.

Transmission of an output pulse by the transceiver is achieved primarily by means of an oscillator comprising a transformer including a common core TF1A, TF1B on which there are three windings W1, W2, and W3. W1 is a secondary winding tuned in parallel with a capacitor C14 to the frequency of oscillation of the transmitter, for example 120 KHZ.

The winding W2 is center-tapped and, as indicated, has a larger number of turns than the winding W1. The center tap of the winding W2 is returned to ground through a storage capacitor C15. The upper end of the winding W2 is connected to ground through the collector-to-emitter path of an npn transistor Q11. The lower end of the winding W2 is connected to ground through the collector-to-emitter path of an npn transistor Q12.

The base of the transistor Q11 is connected through a resistor R28 to the upper end of the winding W3. The center tap of the winding W3 is returned to ground through a capacitor C16. The base of the transistor Q12 is returned to the lower end of the winding W3 through a resistor R29.

The power supply voltage B3+ is supplied to the positive terminal of the capacitor C16 through a voltage divider comprising a resistor R30 in series with a resistor R31. With this construction, the capacitor C16 is normally charged to provide some forward bias on both of the transistors Q11 and Q12.

A positive TRANSMIT pulse applied to the base of the transistor Q12 increases the conduction through the collector-to-emitter path, creating an unbalanced condition with consequent oscillation in the circuit comprising the winding W2, producing an output signal in the secondary tank circuit, comprising the winding W1 and C14 at the tuned frequency of 120 KHZ, for approximately 250 microseconds. The magnitude of the output signal applied over the transmit/receive lead 22 to the transducer X1 varies from about 30 to about 250 to 300 volts peak-to-peak in dependence on the voltage across the capacitor C15, established in a manner to be described.

The portion of the transceiver of FIG. 6 that is primarily devoted to reception includes the tank circuit W1, C14. In the receive mode, that circuit serves as a band-pass filter to discard frequencies other than the 120 KHZ frequency transmitted signal, and thus serves to reject noise. The tuned received signal appearing across the tank circuit is applied through a resistor R1 to a limiter comprising oppositely poled diodes CR1 and CR2. These diodes limit the signal applied to the receiver amplifying circuits to about 300 to 400 millivolts peak-to-peak. The resistor R1 serves both to limit the current to the diodes and to assist in matching the impedance of the receiver to the line, in combination with the cable impedance, the inductor L1, and the capacitor C1.

The input signal across the limiter comprising the diodes CR1 and CR2 is capacitance-coupled, through a capacitor C4, to a preamplifier comprising an n-p-n transistor Q1. The base of the transistor Q1 is connected to the capacitor C4. It is also connected to a biasing circuit extending from the positive terminal of the oscillator power capacitor C15 through resistors R13, R2 and R3 in series, with the base of the transistor Q1 being connected to the junction of the resistors R2 and R3. A pair of filter capacitors C2 and C3 are connected between the junction of the resistors R2 and R13, as shown.

The emitter of the transistor Q1 is returned to ground through a resistor R5 in series with a resistor R6. The resistor R6 is in parallel with a filter capacitor C5.

The collector of the transistor Q1 is returned to the positive terminal of the oscillator capacitor C15 through a resistor R4 in series with the resistor R13 described above. The gain of the preamplifier comprising the transistor Q1, which is biased to operate in the class A mode, is therefore determined by the voltage across the capacitor C15.

The preamplifier comprising the transistor Q1 is followed by a tuned, gain-controlled amplifier comprising a p-n-p transistor Q2. The base of the transistor Q2 is connected to the collector of the transistor Q1. The emitter of the transistor Q2 is connected to the positive terminal of the transmitter power-determining storage capacitor C15 through the resistor R13 in series with a resistor R7 and a resistor R8 paralleled by an integrating capacitor C6. The collector of the transistor Q2 is returned to ground through a tuned circuit comprising an inductor L2, a capacitor C7, and a resistor R9 that serves to reduce the Q of the tank circuit L2–C7. The latter is tuned to the oscillator frequency; e.g., to 120 KHZ.

The output signal of the receiver, appears across the resistor R9, is applied both to an automatic gain and power control circuit, to be described and, through a current limiting resistor R11, as a signal labelled ECHO to the amplifier and echo detecting circuit 27, briefly described in connection with FIG. 5 and to be described in detail below.

At times, the ECHO signal is inhibited by a clamp circuit comprising an n-p-n transistor Q3 having its collector connected to the junction of the capacitor C7 and the resistor R11, and its emitter grounded. The base of the transistor Q3 is returned to ground through a resistor R69. The base is also connected to a line that at times receives a positive pulse labelled RCVP, to disable the receiver momentarily (e.g., for about 1 millisecond) following a received echo pulse, to inhibit the reception of a second echo pulse from a reflector within a few feet, for example 2 ½ feet, from the nearest reflector. That serves to prevent various undesirable echo detections, primarily that from a hard pan bottom layer underlying a foot or two of mud or sand.

A third connection to the base of the clamp transistor Q3 is made through a resistor R66 from a line that at times receives a positive signal RCV, produced while the transceiver is in the transmit mode to inhibit the direct reception of the transmitted master pulse.

The received signal appearing across the controlled-Q tank circuit comprising the resistor R9, the inductor L2, and the capacitor C7 is employed to control both the output power of the transmitter and the gain of the receiver. For these purposes, the signal is applied through a resistor R33 to the base of an n-p-n transistor Q13 having a grounded emitter. The collector of the transistor Q13 is returned to the emitter through a capacitor C26. The collector is returned to the positive battery supply potential B1+ through a resistor R32.

A further connection extends from the collector of the transistor Q13 through a resistor R71 in series with a diode CR4 having its cathode connected to the resistor R71 and its anode connected to the base of a p-n-p transistor Q10. The base of the transistor Q10 is also returned to the positive supply B1+ through a capacitor C17.

The collector of the transistor Q10 is grounded. Its emitter is connected to the base of an n-p-n transistor Q9, and to the potential source B1+ through a resistor R27. The collector of the transistor Q9 is connected directly to the power supply terminal at B1+. The emitter of the transistor Q9 is connected to the positive terminal of the capacitor C15 through a resistor R26.

In the absence of a positive signal across the resistor R9, the transistor Q13 is biased to cut-off. The transistor Q10 is cut-off under these circumstances, biasing the transistor Q9 into conduction and allowing the charge on the power capacitor C15 to approach the 12 volt value of the supply voltage B1+. That voltage also serves as the collector supply for the amplifiers Q1 and Q2, thus setting those amplifiers to a maximum gain.

When a signal appears across the resistor R9 at the tank frequency to which the circuit L2–C7 is tuned, the positive peaks turn on the transistor Q13. Over a period determined by the circuit constants, the charge on the capacitor C17 is thereby increased and reduces the voltage at the base of the transistor Q10. The current through the transistor Q9 is thereby reduced, reducing the charge on the capacitor C15. The circuit constants are preferably so chosen that the primary effect, as the charge on the capacitor C15 is reduced from near 12 volts to about 6 volts, is reduced power output of the transmitter tank C14, W1. As the voltage across the capacitor C15 is reduced from about 6 volts to its designed minimum in the vicinity of 2 volts, transmitting power reduction and gain reduction in the receiver are both effected, so that shallow water operation is facilitated and multiple echoes are too attenuated to cause false signal indications. The effect of the gain and power control signals are intentionally delayed for several cycles; i.e., from five to seven seconds for a complete change over the range of gain and power control, so that individual signals that may be unusually strong or weak are ignored. The received ECHO signal is thus kept within useful limits and adjusted to meet the changing conditions of depth and bottom character. By the combined control thus effective, it is possible to achieve a dynamic range for the transceiver in the neighborhood of 40 to 50 Db., an extremely large range by prior art standards.

Fish signals are normally considerably weaker for the same depth than hard bottom signals. However, fish of the kind which it is one purpose to detect normally swim considerably closer to the surface than to the bottom, and their reflections are according less attenuated. Another characteristic of fish reflection signals is that they tend to be intermittent in nature, so that both bottom depth and fish depth are intermittently displayed in the fish search mode of operation, with the bottom depth reflections primarily controlling the gain of the receiver and the power output of the transmitter.

FIG. 7 shows a schematic wiring diagram of a suitable transmit pulse generator 25 for the system of our invention. It includes a unijunction transistor Q15 connected as a relaxation oscillator having an adjustable pulse repetition rate, with provision for producing a control pulse of variable duration.

In particular, one base $a$ of the unijunction Q15 is returned to ground through a fixed resistor R37 in series with a variable resistor, here shown as a potentiometer P2. In the "Feet" position of the switch S2, i.e., with the deck S2B in positions $a$ or $b$, the potentiometer P2 is effective to introduce a keel offset function in a manner to be described. In the "Fathoms" mode, the keel offset is assumed to be negligible, and so in the $c$ and $d$ positions of the switch S2B, the control P2 is shorted out.

The base terminal $b$ of the unijunction transistor Q15 is connected to the source potential B3+ through a resistor R36 that is also connected to the base of a p-n-p transistor Q14, connected as a pulse amplifier. The emitter of the transistor Q14 is connected to the supply terminal at B3+ through an integrating network comprising a resistor R34 in parallel with a capacitor C18, and a series resistor R35.

The emitter terminal of the unijunction transistor Q15 is connected to ground through a capacitor C19, and to the terminal at B3+ through a resistor R39. The resistor R39 and capacitor C19 determine the pulse rate of the relaxation oscillator at about 2 pulses per second in the "Fathoms" mode of operation with the switch deck S2A in positions $c$ or $d$. In the "Feet" mode of operation, with the switch S2A in positions $a$ or $b$, a higher pulse rate of about 3 pulses per second is established by connecting a resistor R40 in parallel with the resistor R39 to reduce the time constant of the circuit. In any position of the switch S2, the unijunction transistor Q15 will be gated on to discharge the capacitor C19 through the resistor R37 (and the control P2 if it is in circuit), when the firing potential is established by charging the capacitor C19 to the potential at which the emitter will gate the transistor into conduction. The resulting drop in potential at base $b$ of the unijunction will turn on the transistor Q14, producing the positive TRANSMIT pulse at its collector.

At the same time, the positive potential produced at base $a$ of the unijunction will gate the transistor Q16 into conduction through the resistor R41 for a time determined by the RC constant C19 (R37 + P2), or C19 (R37), dependent on the position of the switch S2. A longer pulse will thus be produced in the "Feet" mode of operation, to introduce a keel offset delay in a manner to be described.

The transistor Q16 is an n-p-n type with a grounded emitter and a collector returned to the source potential B4+ through a resistor R42. Its collector produces a negative-going pulse MP when the capacitor C19 discharges through the unijunction Q15. The positive pulse MP is produced by the inverter I, as described above.

At the same time, a negative going signal is applied to the base of a p-n-p transistor Q17 through a resistor R43. The transistor Q17 has an emitter connected to the source potential B4+, and a collector connected to ground through a resistor R67 and a capacitor C22 in series. The result is a positive pulse RCV at the collector of the transistor Q17 that disables the receiving portion of the transceiver for the duration of the transmit pulse, in addition to such keel offset delay that may be imposed by the control P2 in the $a$ and $b$ positions of the switch S2.

FIG. 8 shows the details of a preferred embodiment of the echo amplifier-detector 27. It comprises a tuned amplifier including an n-p-n transistor Q4 and a p-n-p transistor Q5, followed by a polarity-inverting electronic switch including an n-p-n transistor Q6, at the collector of which the positive pulse ER is produced.

In detail, the ECHO signal produced by the transceiver is applied to the base of the n-p-n transistor Q4. The base of the transistor Q4 is returned to the power supply potential at B2+ through a resistor R12. The emitter of the transistor Q4 is returned to ground through a resistor R16. The collector of the transistor Q4 is directly connected to the base of a p-n-p transistor Q5. It is also returned to the source potential B2+ through a current limiting resistor R14 in series with reduced-Q tank circuit including an inductor L3, a capacitor C8 tuned with the inductor L3 to the transmitter frequency of, for example, 120 KHZ, and a resistor R15 to reduce the Q of the tank to a useful value.

The output of the tank circuit appearing across the capacitor C8 is applied between the base of the p-n-p transistor Q5, the latter having a grounded collector, and the upper terminal of a resistor R17, the lower terminal of which is connected to the emitter of the transistor Q5. The upper terminal of the resistor R17 is returned to the source potential B2+ through a capacitor C9.

The emitter of the transistor Q5 is returned to ground through a resistor R18 in series with a resistor R19. The junction of the resistors R18 and R19 is connected to the base of the transistor Q6. An integrating capacitor is connected between the base and collector of the transistor Q6. The emitter of the transistor Q6 is grounded, and the collector is returned to the source potential B4+ through a resistor R20.

Operation of the echo amplifier and detector 27, in the absence of a clamp signal RCV or RCVP applied to the transceiver of FIG. 5 and in the presence of a received ECHO signal at the transmitter frequency, is as follows: Positive peaks in the returned ECHO signal build up a voltage across the tank circuit comprising the inductor L3, resistor R15 and capacitor C8. In response, the transistor Q5 is gated on to produce a negative-going signal from the base to the emitter of the transistor Q6, cutting it off and producing the positive signal ER.

FIG. 9 illustrates the details of the mode control circuit 29, controlled by the switch deck S2D. The control comprises a pair of conventional flip-flops F1 and F2, each reset by the pulse MP. The logic 0 output terminal of the flip-flop F1 produces the positive signal DISPLAY ENABLE when the flip-flop F1 is reset.

The first received pulse ER sets the flip-flop F1, removing the signal DISPLAY ENABLE to allow the depth representing the first received echo, which will be from fish, if present, or from the first reflecting bottom layer, if no fish are present. Setting the flip-flop F1 enables an AND gate 50, and produces the signal ERF that disables the counting circuit 28 (FIG. 5). If a second echo pulse is received (beyond the 1 millisecond delay introduced by the leading edge of the pulse ERF through the resistor R70 and capacitor C23, FIG. 5), it will set the flip-flop F2 through the gate 50 enabled by the setting of the flip-flop F1.

In positions *a* and *d* of the switch S2, in which fish depth is displayed, the switch S2D transmits a FISH signal from the logic 1 output terminal of the flip-flop F2, to indicate by actuation of the audible alarm signal 30 (FIGS. 5 and 10, the latter to be described) that the depth displayed is the depth of the fish, and not of the bottom. Since the response from fish will generally be rather intermittent, intervening displays of bottom depth will inform the operator that the actual depth of the water is beyond the limits set by the depth alarm switch S3 (FIG. 5), unless the actual depth does in fact decrease until repeated alarm signals are produced.

FIG. 10 shows the details of the depth alarm system. The output alarm signal is produced by a conventional audible alarm 51, tuned to produce a piercing sound in the upper portion of the readily audible frequency range, when current from the supply terminal at B1+ is allowed to flow through it by gating on an n-p-n transistor Q23. As shown, the collector of the transistor 23 is connected to one terminal of the alarm energization coil, and the emitter is grounded. The base is connected through a resistor R62, to gate the transistor into conduction when the FISH signal is produced. The base is also connected through a resistor R63 to a gating circuit controlled by the counters 32 and 33, the switch S3, and the signals MP and ER.

The switch S3 is set to determine the minimum depth at which the alarm 51 will be actuated. Assume the following conventional binary decimal code:

| Dec. | U4 | U3 | U2 | U1 | T4 | T3 | T2 | T1 |
|---|---|---|---|---|---|---|---|---|
| 0 | 0 | 0 | 0 | 0 | 0 | 0 | 0 | 0 |
| 1 | 0 | 0 | 0 | 1 | 0 | 0 | 0 | 0 |
| 2 | 0 | 0 | 1 | 0 | 0 | 0 | 0 | 0 |
| 3 | 0 | 0 | 1 | 1 | 0 | 0 | 0 | 0 |
| 4 | 0 | 0 | 0 | 0 | 0 | 0 | 0 | 0 |
| 5 | 0 | 0 | 0 | 1 | 0 | 0 | 0 | 0 |
| 6 | 0 | 0 | 1 | 0 | 0 | 0 | 0 | 0 |
| 7 | 0 | 0 | 1 | 1 | 0 | 0 | 0 | 0 |
| 8 | 0 | 0 | 0 | 0 | 0 | 0 | 0 | 0 |
| 9 | 0 | 0 | 0 | 1 | 0 | 0 | 0 | 0 |
| 10 | 0 | 0 | 1 | 0 | 0 | 0 | 0 | 1 |
| 11 | 0 | 0 | 1 | 1 | 0 | 0 | 0 | 1 |
| ... | | | | | | | | |
| 19 | 0 | 0 | 0 | 1 | 0 | 0 | 0 | 1 |
| 20 | 0 | 0 | 0 | 0 | 0 | 0 | 1 | 0 | etc.

The apparatus includes a number of NAND gates 53, 54, 55, 56, 57, 58, 59 and 60. Each may be assumed to have the property that its output signal will be zero volts when and only when all input terminals are at positive potentials, and at a positive voltage when any input terminal is negative or at zero volts.

A flip-flop F3 is provided that is set to produce a positive level at its logic 1 output terminal and a zero level at its logic 0 output terminal when the positive pulse ER is produced, and is reset to the opposite state when the level MP is present (recalling that MP is negative when present).

The NAND gates 59 and 60 are interconnected to be enabled as a flip-flop when the negative pulse MP is applied to the gate 60, forcing its output to go positive and thereby applying a positive voltage to the gate 59. When the pulse MP appears at a positive voltage, the flip-flop F3 is reset to apply a logic 0 signal to one terminal of the gate 58, forcing its output to logic 1. With both input terminals of the gate 59 now at logic 1, its output goes to zero and the transistor Q23 remains cut off.

The NAND gates 56 and 57 are also interconnected to be enabled as a flip-flop by the negative pulse MP applied to the gate 57, applying a logic 1 signal to one terminal of the gate 56. The apparatus is then in condition to detect the occurrence of an echo return pulse ER before a depth greater than that set by the switch S3 is executed. That will be determined by the state of the counters 32 and 33 when the pulse ER occurs.

In the embodiment shown, in the *a* position of the switch S3, if the count of 6 (or 0110) is reached by the counter 32 before ER is received, both input terminals of the gate 55 will go to logic 1, placing a zero on one input terminal of the gate 56 and setting the flip-flop 56-57 with an output signal of logic 0 on its output terminal, (the output terminal of the gate 57) whereupon that signal will remain regardless of the state of the gate 55 until it is removed by the next negative pulse MP applied to the gate 57. When the pulse ER is later received, the flip-flop F3 will be set, applying a logic 1 signal to the gate 58, but without effect on the alarm circuit because the gate 58 is now disabled by the gate 57. However, should the pulse ER arrive before the count of 6, the output of the gate 57 will still be at logic 1, and setting the flip-flop F3 will produce a logic 1 at the output of the gate 59, applying a positive voltage to the base-emitter junction of the transistor Q23 and sounding the alarm.

Similarly, in the *b* position of the switch S3, the alarm will not be sounded if the count of 11 (U1=1 and T1=1) is reached before ER is received; otherwise it will be sounded. In the *c* position of the switch S3, the count of 16 (U2= U3 = T1 = 1) disables the alarm. In the *d* position of the switch S3, the operative signal is 21 (T2 = U1 = 1). Thus, in the "Feet" positions of the switch S2, the alarm may be set to respond to depths equal to or less than 5, 10, 15 or 20 feet, and in the "Fathoms" positions of the switch S2, the minimum depths will be 5, 10, 15 and 20 fathoms. Of course, any set of minimum depths could be similarly chosen, those cited being selected primarily for purposes of illustration and as incorporated in the presently preferred embodiment of the invention.

FIG. 11 shows the details of the count pulse generator 28. Basically, it comprises a rate-controlled relaxation oscillator comprising a unijunction transistor Q21 having one base returned to ground through a resistor R59, and a second base returned to the supply potential at B3+ through a resistor R58. In the "Feet" positions $a$ and $b$ of the switch S2, the time constant, or pulse repetition rate, is set by a circuit extending through a resistor R50 in series with a trimming resistor P3, over contacts $a$ or $b$ of the switch deck S2C, and through a capacitor C20 to ground. This circuit is disabled at times by a positive COUNT signal applied to the base of an npn transistor Q20 that shunts the capacitor C20 through a diode CR8 in series with a relatively small resistor R52.

Similarly, in the "Fathoms" positions $c$ and $d$ of the switch S2, the pulse repetition rate is set by a fixed resistor R53, a trimming resistor P4, and the capacitor C20. When the COUNT signal turns on the transistor Q20, the fathoms counting circuit is disabled by shunting the capacitor C20 through a diode CR9, a resistor R55, that is relatively small with respect to the resistors R53 and P4, and through the collector-to-emitter path of the transistor Q20 to ground.

The count pulse generator as described above is synchronously enabled by the trailing edge of the pulse MP and remains enabled until the occurrence of the pulse ER.

FIG. 12 shows the details of the operation monitor. It will be obvious to those skilled in the art that the functions to be described could be performed by the circuits shown, or by other conventional available logic circuits.

The flip-flop F4 is initially reset by the first negative pulse MP that occurs, and will remain reset so long as the switch S1 (FIG. 4) remains closed to supply power to the equipment, except in the event of certain potentially dangerous situations that may occur, as will be described. The flip-flop F4, if set, will again be reset by the next occurring pulse MP.

When reset, the flip-flop F4 applies a ground level signal from its logic 1 terminal to the base of an npn transistor Q24 through a resistor R64. That cuts off the transistor Q24.

The transistor Q24 has its collector returned to the power supply terminal at B4+ through a resistor R65. When the transistor Q24 is cut off, its collector thus applies forward bias between the base and emitter of an npn power transistor Q26, the emitter of the latter being grounded. The collector of the transistor Q24 is connected to the base through a capacitor 24 to slow and smooth the transistor switching transients.

The collector of the transistor Q26 is connected over the switch deck S2G in its $a$ or $b$ positions through the FEET indicating lamp K1, in series with a diode CR24, to the power supply terminal at B2+. In the $c$ and $d$ positions of the switch S2, the collector of the transistor Q26 is connected through FATHOMS lamp K2 and the diode CR24 to the terminal at B2+. Thus, so long as the flip-flop F4 is reset, illuminating current will flow through either the lamp K1 or the lamp K2 through the collector-emitter path of the transistor Q26 to ground. Should the flip-flop F4 be set, the transistor Q24 would be turned on, the transistor Q26 would be turned off, and the lamp selected by the switch S2G would be extinguished.

In the $a$ and $b$ positions of the switch S2, the flip-flop F4 will be set each time a depth over 100 feet, and thus beyond the capacity of the 0–99 foot indicator is encountered, or in the event that no echo pulse ER is received following a transmit pulse. In either event, the tens counter 33 (FIG. 5) will overflow and produce the signal OF (in a conventional manner which it is not thought necessary to illustrate in detail). This pulse OF is applied over contacts $a$ or $b$ of the switch S2F to one terminal of a NAND gate 65. A second terminal of the gate 65 receives a logic 1 signal from terminals $a$ and $b$ of the switch deck S2E. The output terminal of the gate 65 is connected to the set terminal of the flip-flop F4 to set it when the output of the gate 65 goes to logic 0, so that the lamp K1 will be extinguished until the next pulse MP resets the flip-flop F4. A single reading over 100 feet, or a single failure to receive an echo pulse ER, will thus cause the lamp K1 to blink once; repeated occurrences will cause periodic blinking of the lamp K1. The cause of the blinking can be determined by turning the switch S2 to position $c$, whereupon a continuous "fathoms" reading indication should be produced by the lamp K2 and the indicator should display the depth in fathoms. If no echo pulses ER are being received, the fathoms indication would not be displayed because the signal DISPLAY ENABLE would be produced by the mode control circuit 29 (FIG. 9).

In the "Fathoms" mode of operation, the switch S2 is in either position $c$ or position $d$. In either case, the "Fathoms" indicator lamp K2 is enabled over contact $c$ or $d$ of the switch deck S2G, and the signal ER, when it appears, is applied to one terminal of the gate 65, whereas the output signal from a NAND gate 63 is applied to the other terminal of the gate 65.

A NAND gate 61 receives the signal T1 from the ten's counter 33 (FIG. 5), which becomes positive when the depth count, in feet or fathoms, reaches 10. The output signal from the gate 61 is applied to one input terminal of a NAND gate 62, which has a second input terminal connected to the output terminal of the gate 63. The second terminal of the gate 63 is connected to receive the negative pulse MP, which forces the output of the gate 63 to logic 1 (positive), where it is held by the gate 62 so long as T1 is not present. If ER occurs before T1 occurs, the combination of ER and the positive signal at the output of the gate 63 will cause the flip-flop F4 to be set, producing a logic 1 signal at the logic 1 terminal of the flip-flop, turning on the transistor Q24, turning off the transistor Q26, and extinguishing the lamp K2 until the next pulse MP. That indicates a depth below ten fathoms, signaling the operator to move the switch S2 into one of its "Feet" positions for a more accurate depth indication. On the other hand, if the signal T1 appears before the signal ER is produced, the gate 63 will be forced to a logic 0 output and there held by the gate 62 until the next MP pulse. Note that once a T1 pulse has been produced, the gate 61 loses control over the storage circuit, or flip-flop, provided by the gates 62 and 63, which must be reset by the negative pulse MP.

Having described the overall operation of the system of our invention in conjunction with FIGS. 4 and 5, and the details of the operation of the components of FIG. 5 and their interrelation with other components in conjunction with FIGS. 6–12, no further detailed description is deemed necessary. In brief summary, once the switch S1 (FIG. 4) is closed, and following the period of 5–7 seconds during which the response of the transceiver adjusts to the depth of the water, the apparatus is in condition for indicating the depth of the water in feet or fathoms as selected by the setting of the switch S2. An alarm will be sounded at any depth below that selected by the setting of the switch S3. In the appropriate positions of the switch S2, an audible alarm will also be sounded when fish are detected, and the depth of the fish will be displayed. The three-stage tuning of the receiver results in high selectivity to the transmitted pulse frequency. The combination of transmitter power and receiver gain control results in a large useful dynamic range, and serves to prevent multiple echoes in shallow water.

Many of the components of the system perform logical functions, and suitable circuits for the purpose can readily be selected by the artisan from those widely available. As a guide to the construction of the transceiver, amplifier-detector and pulse generating circuits, the following component values were employed in a practical embodiment of the invention.

Resistors, in ohms

R1, R11 = 6.8K
R2 = 120K
R3, R9, R15 = 100K
R4, R6 = 5.6K
R5, R26, R71 = 100
R7 = 43
R8, R33, R42 = 2.0K
R12 = 150K
R14, R19, R27, R67 = 1.0K
R16, R28, R29 = 27
R17, R37, R59 = 47
R18 = 5.1K
R20, R21, R32, R62, R63, R69 = 22K
R25 = 120
R30 = 47K
R31 = 2.2K
R34, R50, R55, R56, R57, R64, R66, R70 = 10K
R35 = 22
R36, R58 = 1.6K
R39 = 240K
R40 = 470K
R41, R43 = 4.7K
R52 = 1.8K
R53 = 51.1K
R65 = 510
P2 = 200 max
P3 = 10K max
P4 = 100K max Capacitors, in microfarads unless marked Pf (picofarads)

C1 = 510 Pf
C2, C21 = 0.2
C3, C13 = 10
C4, C14 = 0.01
C5, C6, C9 = 0.1
C7, C8 = 0.0033
C10, C23 = 0.022
C15 = 200
C16 = 6.8
C17 = 22
C18, C22, C24 = 0.05
C19 = 3.3
C20 = 0.039
C26 = 0.05

Inductors, in microhenries

L1 = 1500
L2, L3 = 680 variable

Transistor and diode Types

Q1, Q3, Q4, Q6, Q9, Q16, Q20, Q23 = 2N4124
Q2, Q5, Q10, Q14, Q17 = 2N4126
Q11, Q12 = T1P31
Q13 = 2N1302
Q15, Q21 = 2N4851
Q18, Q24 = 2N3704
Q26 = 2N2270
CR1, CR2, CR4, CR8, CR9 = 1N462
CR7, CR24 = A15F

While we have disclosed our invention with respect to the details of a preferred embodiment thereof, many changes and variations will occur to those skilled in the art upon reading our description, and such can obviously be made without departing from the scope of our invention.

Having thus described our invention, what we claim is:

1. In an acoustic, marine depth-sounder having means for transmitting an acoustic signal downwardly through the water when the vessel is afloat in response to an applied electrical signal, means for receiving acoustic echo signal returns propagated through the water for producing electrical signals in response thereto, and means coupling said transmitting and receiving means for producing a signal indicative of the depth as a function of elapsed time between transmitted and received signals, wherein the improvement comprises:

means for varying the amplitude of transmitted signals;

means for varying the gain of said receiving means; and means responsive to said echo signal returns for controlling said transmitted signal amplitude and said receiving means gain thereby to provide said depth-sounder with maximum dynamic range to optimize the indication of the presence of true bottom signals and enable said depth sounder rapidly to provide said optimal true signals in the presence of sharply changing bottom conditions.

2. The depth-sounder of claim 1, wherein: said transmitted and received signals are pulses.

3. The depth-sounder of claim 2, wherein: means are included for displaying said depth digitally.

4. The depth-sounder of claim 3, wherein: said sounder is adapted to provide a digital display remotely.

5. The depth-sounder of claim 4, wherein: said sounder is adapted to provide a local and remote display simultaneously.

6. The depth-sounder of claim 2, wherein:

said transmitting means includes a pulse generator and means for measuring the time duration between each transmitted pulse and its corresponding echo return pulse.

7. The depth-sounder of claim 6, wherein:
means are included for displaying said depth digitally.

8. The depth-sounder of claim 7, wherein:
means are included for detecting the average level of received echo pulses.

9. The depth-sounder of claim 7, wherein:
means for rapidly determining within a few pulses the amplitude of return echo pulses.

10. The depth-sounder of claim 7, wherein:
said pulse generated includes a unijunction transistor.

11. The depth-sounder of claim 6, wherein:
means are included selectedly to control said receiving gain relative to said amplitude of transmitted pulses.

12. In a digital depth-sounder having means for periodically transmitting an acoustic signal pulse below the water line of a vessel, said means including an electroacoustic transducer, to communicate acoustically with sonic reflectors below the vessel, means for receiving acoustic echo signal return pulses propagated through the water for producing electrical signal pulses in response thereto, and means coupling said transmitting and receiving means for producing a signal indicative of the depth as a function of elapsed time between corresponding transmitted and received signal pulses, wherein the improvement comprises:

Adjustable amplitude transmitting means for periodically applying pulses of electrical energy to said transmitting means to transmit a corresponding pulse of sonic energy downwardly from said vessel;

variable receiving means responsive to electrical signals produced by said transducer in response to the first sonic pulse received by said transducer following each transmitted pulse to produce an echo signal having a level dependent on the amplitude of said transmitted pulse and the amplitude of the echo signal pulse received;

and means responsive to the level of said echo signals for simultaneously adjusting the amplitude of said transmitted pulse and the gain of said receiving means to tend to maintain the average level of the echo signals within presently determined bounds.

13. The apparatus of claim 12, further comprising:
pulse generating means enabled in the interval between each transmitted pulse and the first following echo signal for producing counting signals at a predetermined rate, means for registering said counting signals, means controlled by said transmitting means for resetting said registering means when each transmitted pulse is produced, and display means responsive to each echo signal for displaying the contents of said registering means in preselected digital units.

14. The apparatus of claim 13, further comprising:
means controlled by said registering means and said receiving means for producing an alarm signal when an echo signal is produced and the number of registered counting signals is below a predetermined value.

15. The apparatus of claim 14, further comprising:
means responsive to a second echo signal produced following a transmitted pulse and preceding the next transmitted pulse, and means for producing an alarm signal when such a second echo signal is detected.

16. In an acoustic, distance measuring device having means for transmitting an acoustic signal to a target in response to an applied electrical signal, means for receiving acoustic echo signal returns propagated from said target for producing electrical signals in response thereto, and means coupling said transmitting and receiving means for producing a signal indicative of the target distance as a function of elapsed time between transmitted and received signals, wherein the improvement comprises:

means for varying the amplitude of transmitted signals;

means for varying the gain of said receiving means; and means responsive to said echo signal returns for controlling said transmitted signal amplitude and said receiving means gain thereby to provide said device with maximum dynamic range to optimize the indication of the presence of true target signals and enable said device rapidly to provide said optimal true signals in the presence of sharply changing target conditions.

* * * * *